US009049516B2

(12) United States Patent
Kim et al.

(10) Patent No.: US 9,049,516 B2
(45) Date of Patent: Jun. 2, 2015

(54) METHOD AND APPARATUS FOR CONTROLLING DISTRIBUTION OF SPATIAL SOUND ENERGY

(75) Inventors: Young Tae Kim, Seongnam-si (KR); Jung Woo Choi, Hwaseong-si (KR); Sang Chul Ko, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 687 days.

(21) Appl. No.: 13/218,045

(22) Filed: Aug. 25, 2011

(65) Prior Publication Data

US 2012/0170762 A1 Jul. 5, 2012

(30) Foreign Application Priority Data

Dec. 31, 2010 (KR) ........................ 10-2010-0139839

(51) Int. Cl.

| | |
|---|---|
| ***H04R 5/00*** | (2006.01) |
| ***H04B 3/00*** | (2006.01) |
| ***H04R 3/12*** | (2006.01) |
| ***H04S 7/00*** | (2006.01) |
| *H04R 1/40* | (2006.01) |

(52) U.S. Cl.

CPC *H04R 3/12* (2013.01); *H04S 7/302* (2013.01); *H04R 1/403* (2013.01); *H04R 2201/403* (2013.01); *H04R 2203/12* (2013.01); *H04R 2430/03* (2013.01); *H04R 2499/11* (2013.01); *H04R 2499/15* (2013.01); *H04S 2420/07* (2013.01)

(58) Field of Classification Search

CPC .......... H04R 5/02; H04R 1/403; H04S 7/302; H04S 3/002

USPC ....................... 381/17, 80, 300, 124; 704/500

See application file for complete search history.

(56) References Cited

U.S. PATENT DOCUMENTS

| | | | | |
|---|---|---|---|---|
| 2004/0240697 | A1* | 12/2004 | Keele, Jr. | 381/336 |
| 2006/0095269 | A1* | 5/2006 | Smith et al. | 704/500 |
| 2006/0204022 | A1* | 9/2006 | Hooley et al. | 381/117 |
| 2007/0086606 | A1* | 4/2007 | Goodwin | 381/116 |
| 2009/0087000 | A1* | 4/2009 | Ko | 381/182 |
| 2009/0141915 | A1* | 6/2009 | Ko et al. | 381/182 |
| 2009/0154723 | A1* | 6/2009 | Choi et al. | 381/80 |

FOREIGN PATENT DOCUMENTS

| | | |
|---|---|---|
| JP | 2008-104229 | 5/2008 |
| JP | 2009-010491 | 1/2009 |
| KR | 10-2010-0067839 | 6/2010 |

* cited by examiner

*Primary Examiner* — Vivian Chin
*Assistant Examiner* — William A Jerez Lora
(74) *Attorney, Agent, or Firm* — Staas & Halsey LLP

(57) ABSTRACT

A spatial sound energy (SSE) distribution control apparatus calculates filter coefficients for controlling distribution of the sound energy of an input signal, in consideration of a sound energy ratio between a reduction region for reducing transmission of a sound energy emitted through an array speaker and a concentration region for concentrating transmission of the sound energy and also in consideration of a sound energy efficiency of the concentration region. Also, the SSE distribution control apparatus determines an array size of a speaker in a case where the sound energy ratio is maximized, according to frequency variation of the input signal.

13 Claims, 9 Drawing Sheets

METHOD AND APPARATUS FOR CONTROLLING DISTRIBUTION OF SPATIAL SOUND ENERGY

CROSS-REFERENCE TO RELATED APPLICATIONS

This application claims the benefit of Korean Patent Application No. 10-2010-0139839, filed on Dec. 31, 2010, in the Korean Intellectual Property Office, the disclosure of which is incorporated herein by reference.

BACKGROUND

1. Field

Example embodiments of the following description relate to an apparatus and method for creating a personal sound zone in a position of a listener, using an array speaker.

2. Description of the Related Art

Recently, a technology for creating a personal sound zone (PSZ) is being actively developed to transmit a sound only to a designated listener without dedicated devices such as an earphone or a headset and without inducing noise to other people around the listener.

To create the PSZ, sounds emitted from a plurality of speakers in different directions may be concentrated on a particular region using delay of the sounds from the respective speakers.

According to another method for creating the PSZ, directivity of the sounds is increased using a special speaker capable of high-output and high-frequency vibration or using a sound wave guide.

SUMMARY

According to an aspect an apparatus for controlling distribution of a spatial sound energy (SSE) is provided, the apparatus including a filter coefficient calculating unit, to calculate filter coefficients to control distribution of a sound energy of an input signal which is a sound source signal having a wideband frequency, in consideration of a sound energy ratio between a reduction region, for reducing transmission of a sound energy emitted through an array speaker and a concentration region for concentrating transmission of the sound energy, also in consideration of a sound energy efficiency of the concentration region; and an array size determining unit to determine an array size of a speaker in a case where the sound energy ratio is maximized, according to frequency variation of the input signal.

The filter coefficient calculating unit may include a sound energy calculator to calculate sound energies, of the reduction region and the concentration region, based on a reaction model related to frequencies for calculation of the filter coefficients among various frequencies of the input signal; a sound energy ratio and efficiency calculator, to calculate the sound energy ratio and the sound energy efficiency based on the sound energy of the reduction region and the sound energy of the concentration region; and a weight determiner to determine weights respectively applied to the sound energy ratio and the sound energy efficiency. The filter coefficient calculating unit may calculate the filter coefficients based on a cost function consisting of the sound energy ratio and the sound energy efficiency both applying the weights.

The array size determining unit may calculate the sound energy ratio corresponding to respective frequencies of the input signal and determine the array size in the case where the sound energy efficiency is maximized in the respective frequencies.

The apparatus may further include a signal generating unit to generate a plurality of output signals, to concentrate transmission of the sound energy on the concentration region, by filtering the input signal according to the filter coefficients; and an output unit to output the plurality of output signals based on the array size.

The apparatus may still further include a band dividing unit to divide the frequency band of the input signal into a low frequency band, a medium frequency band, and a high frequency band, according to a predetermined reference. The signal generating unit may include a band filter set to filter the input signal with respect to each of the bands divided from the frequency band, according to the calculated filter coefficients.

The apparatus may yet still further include a control region setting unit to set a control region comprising the reduction region and the concentration region.

The apparatus may even still further include a receiving unit to receive multichannel input signals, containing a sound source, and the filter coefficient calculating unit may calculate the filter coefficients with respect to the respective multichannel input signals, in consideration of the sound energy ratio between the reduction region and the concentration region and the sound energy efficiency of the concentration region.

The receiving unit may include a channel conversion filter to convert the multichannel input signals into 2-channel input signals; and a crosstalk removal filter to remove crosstalk among the 2-channel signals.

The array speaker may include a plurality of speakers separated by partitions, and an aperture size of the array speaker may be determined variably by the plurality of speakers according to the determined array size.

According to another aspect, an apparatus for controlling distribution of a spatial sound energy (SSE) is provided, the apparatus including a receiving unit to receive a first input signal and a second input signal containing different sound sources from each other; a first filter coefficient calculating unit to calculate filter coefficients that control distribution of a sound energy of the first input signal, in consideration of a sound energy ratio between a first reduction region, to reduce transmission of a sound energy of the first input signal and a first concentration region to concentrate transmission of the sound energy of the first input signal and also in consideration of a sound energy efficiency of the first concentration region; and a second filter coefficient calculating unit to calculate filter coefficients that control distribution of a sound energy of the second input signal, by transmitting the sound energy of the second input signal to at least two second concentration regions, to concentrate transmission of the sound energy of the second input signal, using at least two sound beams; and a signal generating unit to generate a plurality of output signals that concentrate transmission of the sound energy on the first concentration region and the second concentration region, by filtering the first input signal and the second input signal according to the filter coefficients.

The apparatus may further include an array size determining unit to determine an array size of a speaker, in a case where the sound energy ratio is maximized, corresponding to the respective frequencies of the plurality of output signals; and an output unit to output the plurality of output signals based on the determined array size.

The first input signal may be a signal containing sound information, and the second input signal may be a masking sound that interrupts transmission of the sound information.

The second filter coefficient calculating unit may include a beam pattern filter coefficient calculator to calculate a filter coefficient for generation of the at least two sound beams with respect to the second input signal, so that interference between beam patterns of the at least two sound beams is minimized.

The beam pattern filter coefficient calculator may calculate the filter coefficients such that the at least two sound beams are generated by combination of the at least two sound beams having different relative phases.

According to another aspect, a method for controlling distribution of a spatial sound energy (SSE) is provided, the method including calculating filter coefficients that control distribution of a sound energy, of an input signal which is a sound source signal having a wideband frequency, in consideration of a sound energy ratio between a reduction region for reducing transmission of a sound energy, emitted through an array speaker, and a concentration region for concentrating transmission of the sound energy, also in consideration of a sound energy efficiency of the concentration region; generating a plurality of output signals to concentrate transmission of the sound energy, on the concentration region, by filtering the input signal according to the filter coefficients; determining an array size of a speaker, in a case where the sound energy ratio is maximized, according to frequency variation of the input signal; and outputting the plurality of output signals based on the determined array size.

The calculating of the filter coefficients may include calculating sound energies of the reduction region and the concentration region, based on a reaction model related to frequencies for calculation of the filter coefficients among various frequencies of the input signal; calculating the sound energy ratio and the sound energy efficiency based on the sound energy of the reduction region and the sound energy of the concentration region; and determining weights respectively applied to the sound energy ratio and the sound energy efficiency, and the calculating of the filter coefficients, may calculate the filter coefficients based on a cost function consisting of the sound energy ratio and the sound energy efficiency both applying the weights.

The determining of the array size may calculate the sound energy ratio corresponding to the respective frequencies of the input signal and determine the array size in the case where the sound energy ratio is maximized in the respective frequencies.

The method may further include receiving multichannel input signals containing a sound source. The calculating of the filter coefficients may calculate the filter coefficients with respect to the multichannel input signals, in consideration of the sound energy ratio between the reduction region and the concentration region, also in consideration of the sound energy efficiency.

According to another aspect, a method for controlling distribution of a spatial sound energy (SSE) is provided, the method including receiving a first input signal and a second input signal each containing a sound source; calculating first filter coefficients that control distribution of the first input signal, in consideration of a sound energy ratio between a first reduction region to reduce transmission of a sound energy of the first input signal and a first concentration region to concentrate transmission of the sound energy of the first input signal and also in consideration of a sound energy efficiency of the first concentration region; and calculating second filter coefficients that control distribution of a sound energy of the second input signal, by transmitting the sound energy of the second input signal, to at least two second concentration regions to concentrate transmission of the sound energy of the second input signal, using at least two sound beams; and generating a plurality of output signals that concentrate transmission of the sound energy on the first concentration region and the second concentration region, by filtering the first input signal and the second input signal according to the first filter coefficients and the second filter coefficients.

The method may further include determining an array size of a speaker in a case where the sound energy ratio is maximized, corresponding to the respective frequencies of the plurality of output signals; and outputting the plurality of output signals based on the determined array size.

The calculating of the second filter coefficients may calculate a filter coefficient for generation of at least two sound beams with respect to the second input signal, so that interference between beam patterns of the at least two sound beams is minimized.

The calculating of the second filter coefficients may calculate the second filter coefficients such that the at least two sound beams are generated by combination of the at least two sound beams having different relative phases.

As described above, filtering is performed using filter coefficients calculated based on a sound energy ratio and a sound energy efficiency of a control region with respect to an input signal. Accordingly, directivity of an output signal emitted from an array speaker may be controlled.

The filtering using the filter coefficients may increase a sound pressure level of a particular region while reducing a sound pressure level of an undesired region.

Since the filtering is performed with respect to a plurality of sound source signals, beams having various different functions may be simultaneously emitted through a single array speaker.

In addition, since sound information and a masking sound are used as a plurality of sound source signals, the sound information may be transmitted to a region corresponding to a listener but interrupted to the other regions by the masking sound.

Moreover, a virtual sound source may be achieved with only an array speaker without wall reflection, by receiving a multichannel input signal. Therefore, a personal sound zone (PSZ) may be created where only the listener may effectively experience stereophonic sound.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Figure 1:
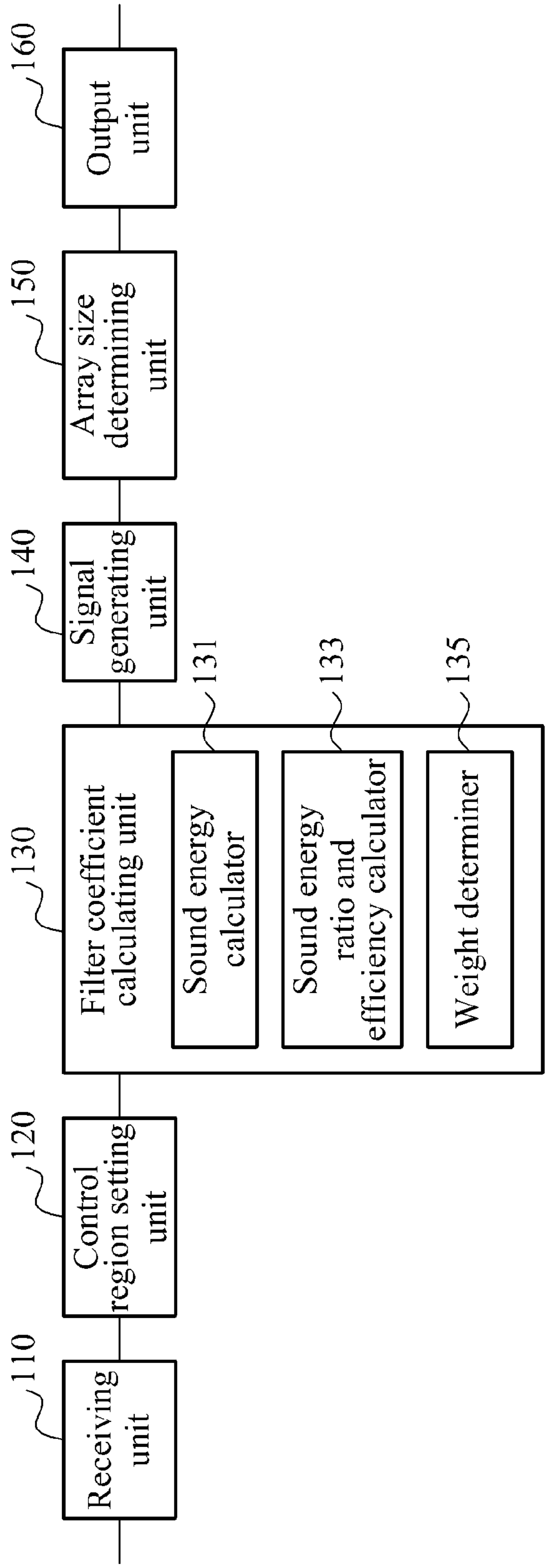
FIG. 1 illustrates a block diagram of a spatial sound energy (SSE) distribution control apparatus according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

An array speaker is constructed by combining a plurality of speakers and used to adjust direction of a sound to be played or to transmit the sound to a specific region.

Directivity, that is a sound transmission principle, means that the sound source signals are transmitted in a specific direction as a plurality of sound source signals are overlapped using phase difference among the sound source signals, so that a signal magnitude is increased in the specific direction. In other words, directivity may be achieved by arranging the plurality of speakers according to a specific configuration and controlling the sound source signals emitted through the array speaker.

When the array speaker system is used, a filter value corresponding to an objective beam pattern, that is, a delay value and a gain value are calculated in advance to obtain a beam pattern of a desired frequency.

In the following description of example embodiments, a sound pressure denotes a force operated by a sound energy, indicated by a physical quantity of pressure. A sound field denotes a region influenced by the sound pressure with respect to a sound source.

A beam pattern denotes a graph indicating an electric field strength of an electromagnetic wave emitted in all directions, that is, 360 degrees from a signal output device such as a speaker and an antenna.

The beam pattern may be obtained by receiving signals from all directions, that is, 360 degrees of the speaker to be measured using an output signal measurer, and displaying the electric field strength received according to angles in a waveform on a polar chart.

FIG. 1 illustrates a block diagram of a spatial sound energy (SSE) distribution control apparatus according to example embodiments.

Referring to FIG. 1, the SSE distribution control apparatus includes a receiving unit 110, a control region setting unit 120, a filter coefficient calculating unit 130, a signal generating unit 140, an array size determining unit 150, and an output unit 160.

The receiving unit 110 receives an input signal containing a sound source. The sound source contains various frequency bands. Also, the receiving unit 110 may receive multichannel input signals containing sound sources.

The control region setting unit 120 sets a control region including a reduction region and a concentration region. The reduction region is a region to reduce transmission of a sound energy emitted through an array speaker. The concentration region is a region to concentrate transmission of the sound energy so that a sound emitted through the array speaker is audible to a listener.

The control region setting unit 120 supplies the filter coefficient calculating unit 130 with position information regarding a zone set as the control region. Here, the position information may be expressed by a specific coordinate value, or by a distance and a direction between the array speaker and the control region.

The control region setting unit 120 may be input with coordinate values of the reduction region and the concentration region by a user. In addition, the control region setting unit 120 may set the control region by selecting at least one region from a plurality of predetermined regions.

The control region setting unit 120 may set only the concentration region, rather than separately setting the reduction region. Also, the control region setting unit 120 may set a plurality of the concentration regions.

The filter coefficient calculating unit 130 may calculate filter coefficients in consideration of a sound energy ratio between the reduction region and the concentration region and a sound energy efficiency of the concentration region. The filter coefficients are used to control distribution of the sound energy emitted through the array speaker.

The sound energy ratio and the sound energy efficiency may be references to determine whether the sound energy is favorably concentrated to the concentration region through the array speaker.

The sound energy ratio refers to a ratio of the sound energy in the concentration region with respect to the sound energy in the reduction region. That is, the sound energy ratio refers to a difference in a sound pressure level. When the sound energy ratio is great, the sound energy transmitted to the concentration region is relatively greater than the sound energy transmitted to the reduction region.

The sound energy efficiency may refer to a ratio of a sound energy of a signal output to the concentration region with respect to a sound energy of the input signal. When the sound energy efficiency is great, most of the sound energy of the input signal is used to generate a sound field of the concentration region, with minimum loss of the input signal being input to the array speaker.

Reasons for considering the sound energy ratio and the sound energy efficiency in determining concentration of the sound energy to the concentration region are as follows.

The sound energy ratio represents a relative ratio of the sound energies between the reduction region and the concentration region. Therefore, even though the sound energy ratio is great, the sound energy emitted from the concentration region may not always be sufficient to be audible to the listener. For example, if the sound energy of the reduction is too small, the sound energy ratio may be relatively great even though the sound pressure in the concentration region is insufficient to be audible to the listener. Therefore, the sound energy ratio, solely, may be insufficient to determine whether the sound energy is concentrated on the concentration region.

In addition, the sound energy efficiency is proportional to a magnitude of the sound energy of the concentration region. However, as the sound energy concentrated on the concentration region increases, the sound energy of the reduction region may also increase. Therefore, relations between the sound energy of the concentration region and the sound energy of the reduction region are necessary to determine whether the sound energy is concentrated to the concentration region.

Since the filter coefficient calculating unit 130 calculates the filter coefficients, considering the sound energy ratio between the concentration region and the reduction region, and the sound energy efficiency, the sound energy may be concentrated to the concentration region even with a low-frequency signal. Also, a sufficient difference in the sound pressure level may be guaranteed with a minimum output of the array speaker.

Hereinafter, the filter coefficient calculating unit 130 will be described in further detail.

The filter coefficient calculating unit 130 may include a sound energy calculator 131, a sound energy ratio and efficiency calculator 133, and a weight determiner 135.

The sound energy calculator 131 may calculate the sound energies of the reduction region and the concentration region, based on a reaction model related to frequencies for calculation of the filter coefficients among various frequencies of the input signal.

Here, the reaction model refers to a standardized form, such as a transfer function, for indicating relations between the array speaker and the control regions. That is, the reaction model may be a function that indicates relations between a sound signal output from a position of the array speaker and a sound energy in a position at a predetermined distance from the array speaker, using physical parameters related to the both positions. The position at the predetermined distance from the array speaker is called a field point.

The reaction model related to the sound signal emitted through the array speaker may be obtained by a theoretical method or an experimental method.

According to the theoretical method, the reaction model is constructed using an equation of a sound propagation between the array speaker and the field point. When a sound pressure is defined with respect to at one field point at a predetermined distance from one sound source, that is, one of the speakers constituting the array speaker, a sound pressure generated through the array speaker at the field point may be calculated by integrating a sound pressure defined in relation to a size of the array speaker.

According to the experimental method, the reaction model may be obtained based on a specific sound source signal applied to one of the speakers constituting the array speaker and output, and the specific sound source signal measured at the field point. The specific sound source signal refers to a test sound source used for measurement of an emitted sound source signal. The specific sound source signal may include an impulse signal or a white Gaussian noise.

The sound energy ratio and efficiency calculating unit 133 may calculate the sound energy ratio and the sound energy efficiency based on the sound energy in the reduction region and the sound energy in the concentration region which are calculated by the sound energy calculator 131.

The weight determiner 135 may determine weights to be respectively applied to the sound energy ratio and the sound energy efficiency. The weight determiner 135 may apply the weights to consider the relations between the sound energy in the reduction region and the sound energy in the concentration region.

The filter coefficient calculating unit 130 may calculate the filter coefficients based on a cost function composed of results of applying the weights to the sound energy ratio and the sound energy efficiency.

The filter coefficient calculating unit 130 may calculate the filter coefficients by adjusting the weights applied to the cost function, depending on environmental conditions of the SSE distribution control apparatus and depending on embodiments.

The filter coefficient calculating unit 130 may calculate a coefficient of a filter that controls the sound field based on the reaction model. Here, the filter controlling the sound field may be the multichannel filter corresponding to a number of output channels of the array speaker. That is, the filter coefficient calculating unit 130 calculates a plurality of filter coefficients.

Calculation of the filter coefficients will be described in further detail with reference to FIG. 3.

The signal generating unit 140 may filter the input signal according to the filter coefficients calculated by the filter coefficient calculating unit 130, and thereby generate a plurality of output signals for concentrating transmission of the sound energy to the concentration region. The signal generating unit 140 may generate the plurality of output signals by convoluting the input signal and the filter coefficients.

The array size determining unit 150 may select from the array speaker at least one speaker to emit the plurality of output signals. In addition, the array size determining unit 150 may be input by a user with a position or a number of the at least one speaker to emit the plurality of output signals.

The array size determining unit 150 may calculate the sound energy ratio between the concentration region and the reduction region according to frequency variation of the input signal. Since the input signal is the sound source signal containing various frequencies, the array size determining unit 150 may calculate the sound energy ratio with respect to the various frequencies of the input signal.

The array size determining unit 150 may determine an array size in a case where the sound energy ratio is maximized, as an array size of the array speaker for emission of the plurality of output signals. Therefore, the array size may be varied according to the frequencies of the input signal. In other words, the array size of the array speaker is variable. Also, among the speakers constituting the array speaker, the at least one speaker emitting the plurality of output signals may be varied according to the frequencies of the input signal.

The array size determining unit 150 may transmit the plurality of output signals generated by the signal generating unit 140 to the array speaker according to the determined array size.

The output unit 160 may output the plurality of output signals generated by the signal generating unit 140, based on the array size determined by the array size determining unit 150. The output unit 160 may output the plurality of output signals through speakers within a range of the determined array size among the speakers constituting the array speaker.

Figure 2:
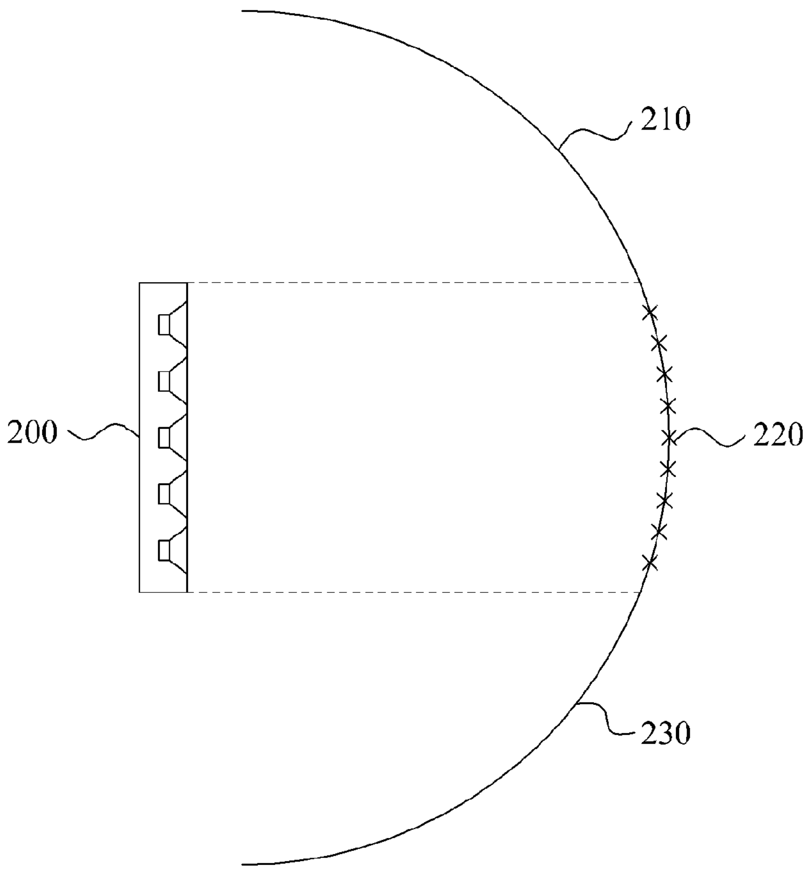
FIG. 2 illustrates a diagram showing a region controlling distribution of an SSE, according to example embodiments.

FIG. 2 illustrates a diagram showing a region controlling distribution of the SSE, according to example embodiments.

Referring to FIG. 2, the sound emitted from an array speaker 200 may be transmitted to a front side and partially to lateral sides of the array speaker 200. Therefore, listeners around the array speaker 200 may experience an inconvenience of having to listen to the emitted sound regardless of their desire.

The SSE distribution control apparatus according to the example embodiments may control distribution of the sound energy emitted through the array speaker 200, by dividing a surrounding region of the array speaker 200 into a concentration region 220 and reduction regions 210 and 230.

The concentration region 220 where the sound energy emitted through the array speaker 200 is concentrated may also be called a listening zone, a personal sound zone (PSZ), or a bright zone. The SSE distribution control apparatus may transmit a sound signal with an increased sound pressure to the concentration region 220, by adjusting directivity of the array speaker 200.

The reduction regions 210 and 230 where the sound energy emitted through the array speaker 200 is hardly transmitted, may also be called, a quiet zone or a dark zone. The SSE distribution control apparatus may transmit a sound signal with a reduced sound pressure to the reduction regions 210 and 230, by adjusting the directivity of the array speaker 200.

The SSE distribution control apparatus may control distribution of the sound energy with respect to the concentration region 220 and the reduction regions 210 and 230, by varying various parameters for adjusting the directivity, such as, a delay value of signals applied to the respective speakers and an interval among the respective speakers.

Figure 3:
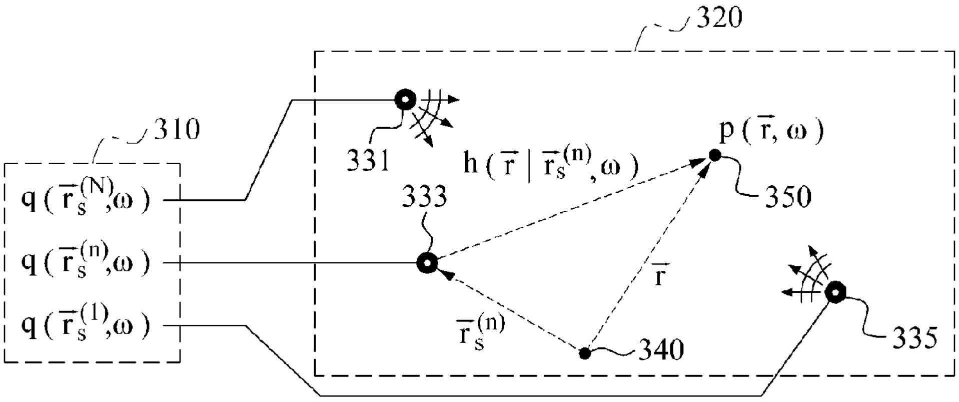
FIG. 3 illustrates a diagram showing a reaction model of an array speaker in an SSE distribution control apparatus according to example embodiments.

FIG. 3 illustrates a diagram showing a reaction model of an array speaker in an SSE distribution control apparatus according to example embodiments.

Referring to FIG. 3, signals filtered through a filter 310 are transmitted to a plurality of speakers 331, 333, and 335 constituting the array speaker. Here, the filter 310 may be a multichannel filter composed of N-number of channels corresponding to the plurality of speakers 331, 333, and 335, respectively. An auditory space 320 refers to a region to which output signals emitted through the plurality of speakers 331, 333, and 335 are transmitted.

The output signals emitted through the plurality of speakers 331, 333, and 335 may be expressed by a sound pressure at an arbitrary field point 350 based on the array speaker. The arbitrary field point 350 is disposed at a distance $\vec{r}$ from an origin 340, that is, a center of the array speaker. The speaker 333 is disposed at a distance $\vec{r}_s^{(n)}$ from the origin 340. A sound pressure at the arbitrary field point 350 may be expressed by multiplication of the reaction models of the plurality of speakers constituting the array speaker and the filter coefficients. The sound pressure at the arbitrary field point 350 may be expressed by Equation 1 as follows.

$$p(\vec{r},\omega)=\sum_{n=0}^{N-1}h(\vec{r}\,|\,\vec{r}_s^{(n)},\omega)q^{(n)}(\omega) \quad \text{[Equation 1]}$$

Here, $p(\vec{r},\omega)$ denotes the sound pressure, $\vec{r}$ denotes a vector from the origin 340 to the field point 350, $\omega$ denotes a frequency of the input signal, $h(\vec{r}\,|\,\vec{r}_s^{(n)},\omega)$ denotes a reaction model of an n-th speaker, and $q^{(n)}(\omega)$ denotes a filter coefficient of an n-th filter corresponding to the n-th speaker. The sound pressure of Equation 1 may be expressed by a vector as in Equation 2 below.

$$p(\vec{r},\omega)=h(\vec{r}\,|\,\vec{r}_s)q \quad \text{[Equation 2]}$$

The sound energy calculator 131 of the filter coefficient calculating unit 130 may calculate a mean of the sound energy of the control region based on the sound pressure in the control region. Here, the mean may be calculated through an arithmetic mean using a field point of the control region. The mean of the sound energy in the concentration region may be expressed by Equation 3 as follows.

$$e_b=\left\langle|p(\vec{r},\omega)|^2\right\rangle_{V_b}=q^H\frac{1}{V_b}\int_{V_b}h(\vec{r}\,|\,\vec{r}_s)^H h(\vec{r}\,|\,\vec{r}_s)dVq=q^HR_bq \quad \text{[Equation 3]}$$

Here, $h(\vec{r}\,|\,\vec{r}_s)^H$ denotes a Hermitian transpose of $h(\vec{r}\,|\,\vec{r}_s)$, $q^H$ denotes a Hermitian transpose of a filter coefficient q, $R_b$ denotes a spatial correlation of the concentration region, and $V_b$ denotes the concentration region.

The sound energy calculator 131 may calculate the sound energies of the concentration region and the reduction region using Equation 3.

The sound energy ratio and efficiency calculator 133 may calculate the sound energy ratio and the sound energy efficiency based on the sound energy of the concentration region and the sound energy of the reduction region, which are calculated using Equation 3.

The sound energy efficiency is defined as a ratio of an energy level in the concentration region with respect to an energy level of the input signal. The sound energy efficiency may be expressed by Equation 4 as follows.

$$\alpha=\frac{e_b}{e_{bmax}}=\frac{q^HR_bq}{\|R_b\|^2q^Hq} \quad \text{[Equation 4]}$$

Here, $\alpha$ denotes the sound energy efficiency, $e_{bmax}$ denotes a maximum sound energy transmittable from the input signal to the concentration region, and $\|R_b\|^2$ denotes an sound energy transmittable from a unitary input power to the control region. $\|R_b\|^2$ is a variable used to unify physical quantities of a numerator and a denominator in the form of energy.

The sound energy ratio may be defined as a ratio of the energy level in the concentration region with respect to an energy level in the reduction region. The sound energy efficiency may be expressed by Equation 5 as follows.

$$\beta=\frac{e_b}{e_d}=\frac{q^HR_bq}{q^HR_dq} \quad \text{[Equation 5]}$$

Here, $\beta$ denotes the sound energy ratio, and $e_d$ denotes the sound energy in the reduction region.

The weight determiner 135 may apply the weights respectively to the sound energy efficiency and the sound energy ratio. Here, the weights may be determined depending on the environmental conditions of the SSE distribution control apparatus and depending on embodiments.

The filter coefficient calculating unit 130 may calculate the filter coefficients based on the cost function considering both the sound energy efficiency and the sound energy ratio. The cost function may be composed of results of applying the weights to the sound energy efficiency and the sound energy ratio. For example, the cost function may be expressed by Equation 6 as follows.

$$\gamma=\frac{e_b}{(1-\kappa)e_d+\kappa e_{bmax}}=\frac{q^HR_bq}{(1-\kappa)q^HR_dq+\kappa\|R_b\|^2q^Hq} \quad \text{[Equation 6]}$$

Here, $\gamma$ denotes the cost function, and $\kappa$ and $1-\kappa$ denote the weights applied to the sound energy efficiency and the sound energy ratio, respectively. The cost function of Equation 6 exclusively consists of the sound energy of the reduction region and the maximum sound energy transmittable to the concentration region. The cost function may be designed in consideration of the sound energy efficiency and the sound energy ratio.

The filter coefficient calculating unit 130 may calculate the filter coefficients with respect to the respective frequencies $\omega$ of the input signal, by applying an Eigen value analysis method with respect to the cost function.

When the filter coefficients are determined, the output signals generated by filtering the input signal may be emitted through the array speaker. Here, the output signals may be emitted through the plurality of speakers arranged at intervals, constituting the array speaker.

However, the array size of the array speaker where the sound energy ratio, between the reduction region and the concentration region is maximized, is varied according to the frequency of the input signal. For example, the array size where the sound energy ratio is maximized is relatively greater in a low-frequency band than in a high-frequency band of the input signal. The array size refers to the entire size of the plurality of speakers arranged to actually emit the output signals.

In an array speaker including a fixed number of speakers, when the frequency of the input signal is relatively low, the array size determining unit 150 may arrange the speakers at relatively large intervals. In this case, the signal generating unit 140 may transmit the output signals to the speakers arranged at relatively large intervals.

In addition, in the array speaker including the fixed number of speakers, when the frequency of the input is relatively high, the array size determining unit 150 may arrange the speakers at relatively small intervals. In this case, the signal generating unit 140 may transmit the output signals to the speakers arranged at relatively small intervals.

Figure 4:
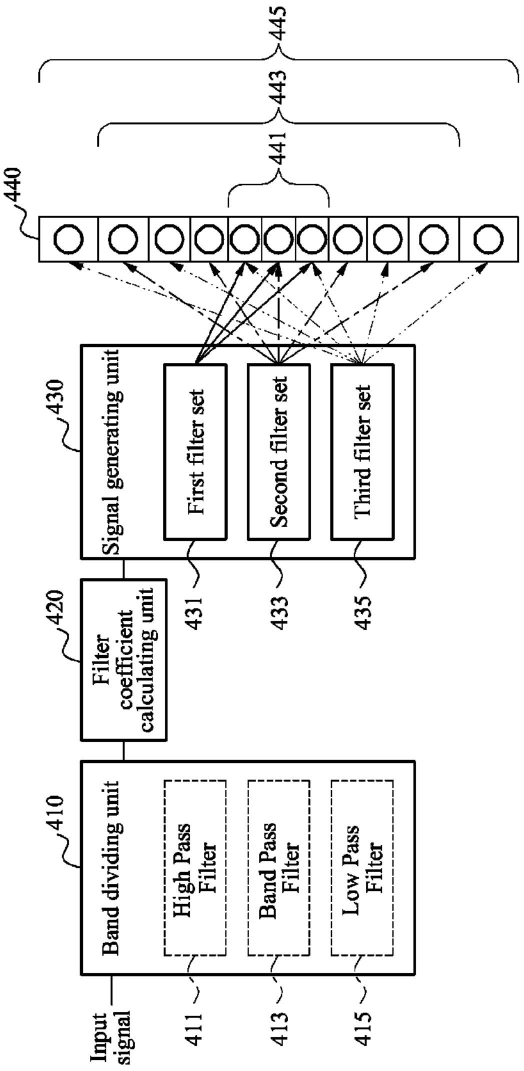
FIGS. 4 and 5 illustrate diagrams each showing a specific exemplary configuration of an SSE distribution control apparatus according to example embodiments.

FIG. 4 illustrates a specific exemplary configuration of an SSE distribution control apparatus according to example embodiments.

Referring to FIG. 4, the SSE distribution control apparatus may include a band dividing unit 410, a filter coefficient calculating unit 420, a signal generating unit 430, and an output unit 440.

The band dividing unit 410 may divide a frequency band of the input signal into a low frequency band, an intermediate frequency band, and a high frequency band according to a predetermined reference. The input signal refers to a sound source signal having a wide band of frequencies. The predetermined reference may be determined according to a frequency band generally accepted concerning the sound source signal. The band dividing unit 410 may include a high pass filter 411, a band pass filter 413, and a low pass filter 415 to divide the input signal according to the frequency band.

The filter coefficient calculating unit 420 may calculate filter coefficients of the high pass filter, filter coefficients of the band pass filter, and filter coefficients of the low pass filter, considering the sound energy ratio between the reduction region and the concentration region and the sound energy efficiency of the concentration efficiency.

The signal generating unit 430 may filter the input signal according to the filter coefficients calculated by the filter coefficient calculating unit 420, with respect to the bands divided by the band dividing unit 410. The signal generating unit 430 may include a first filter set 431, a second filter set 433, and a third filter set 435.

The first filter set 431 may perform first filtering with respect to an input signal of a high frequency band passed through the high pass filter 411. The second filter set 433 may perform second filtering with respect to an input signal of a frequency band passed through the band pass filter 413. The third filter set 435 may perform third filtering with respect to an input signal of a low frequency band passed through the low pass filter 415.

Output signals generated by the first filtering may be transmitted to speakers 441 disposed in a middle of the array speaker. Output signals generated by the second filtering may be transmitted to speakers 443 disposed farther from the middle of the array speaker. Output signals generated by the third filtering may be transmitted to speakers 445 disposed farthest from the middle of the array speaker.

Thus, the array size of the speakers 441, 443, and 445 may be varied according to the frequency band of the input signal. The array size is smallest in the high frequency band and largest in the low frequency band.

The output unit 440 may output the output signals of the respective frequency bands, generated by the signal generating unit 430, through the array speaker. The output unit 440 may output the output signals through the speakers constituting the array speaker, according to the array size corresponding to the frequency band of the input signal, the array size where the sound energy ratio is maximized.

The array speaker includes the speakers separated by partitions. Since the speakers are separated by partitions, interference among the sound energies from the respective speakers may be reduced.

An aperture size of the array speaker may be varied according to the array size corresponding to the frequency band of the input signal. Here, the aperture size may refer to the interval among the speakers constituting the array speaker.

That is the array speaker, having a fixed number of speakers, output signals in the high frequency band are output through the speakers arranged at relatively small intervals in the middle of the array speaker. In this case, the aperture size is relatively small.

Output signals in the low frequency band are output through the speakers arranged at relatively large intervals. In this case, the aperture size is relatively large.

Figure 5:
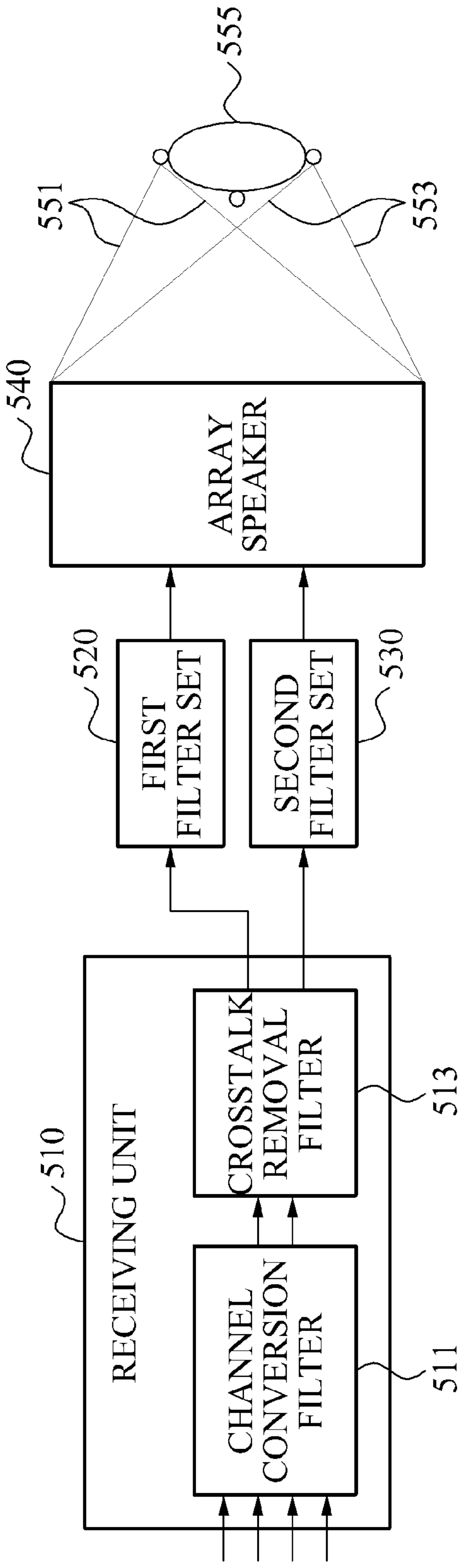

FIG. 5 illustrates a diagram showing a specific exemplary configuration of an SSE distribution control apparatus according to example embodiments.

Referring to FIG. 5, the SSE distribution control apparatus may include a receiving unit 510, a first filter set 520, a second filter set 530, and an array speaker 540.

The receiving unit 510 may receive multichannel input signals each containing a sound source. The receiving unit 510 may include a channel conversion filter 511 and a crosstalk removal filter 513. The multichannel input signals are input to the channel conversion filter 511.

The channel conversion filter 511 may convert the multichannel input signals into 2-channel input signals. For example, 5.1-channel input signals may be converted into 2-channel stereo input signals. Also, the channel conversion filter 511 may convert the multichannel input signals into signals of a smaller number of channels than the multichannel input signals, besides the 2-channel input signals.

The crosstalk removal filter 513 may remove crosstalk between the 2-channel input signals. The crosstalk refers to an interference generated among signals of different channels. Therefore, the crosstalk in a sound source signal may mean jamming.

The first filter set 520 may generate an output signal based on a first filter coefficient. The first filter coefficient may be calculated such that a sound energy of a right signal of the 2-channel stereo input signal is concentrated on a right ear of a listener 555.

The second filter set 530 may generate an output signal based on a second filter coefficient. The second filter coefficient may be calculated such that a sound energy of a left signal of the 2-channel stereo input signal is concentrated on a left ear of the listener 555.

The array speaker 540 may output the output signal generated by the first filter set 520. Here, a sound pressure of the output signal is set to be maximized at the right ear 551 of the listener 555, by the first filter coefficient.

The array speaker 540 may output the output signal generated by the second filter set 530. Here, a sound pressure of the output signal is set to be maximized at the left ear 553 of the listener 555, by the second filter coefficient.

Figure 6:
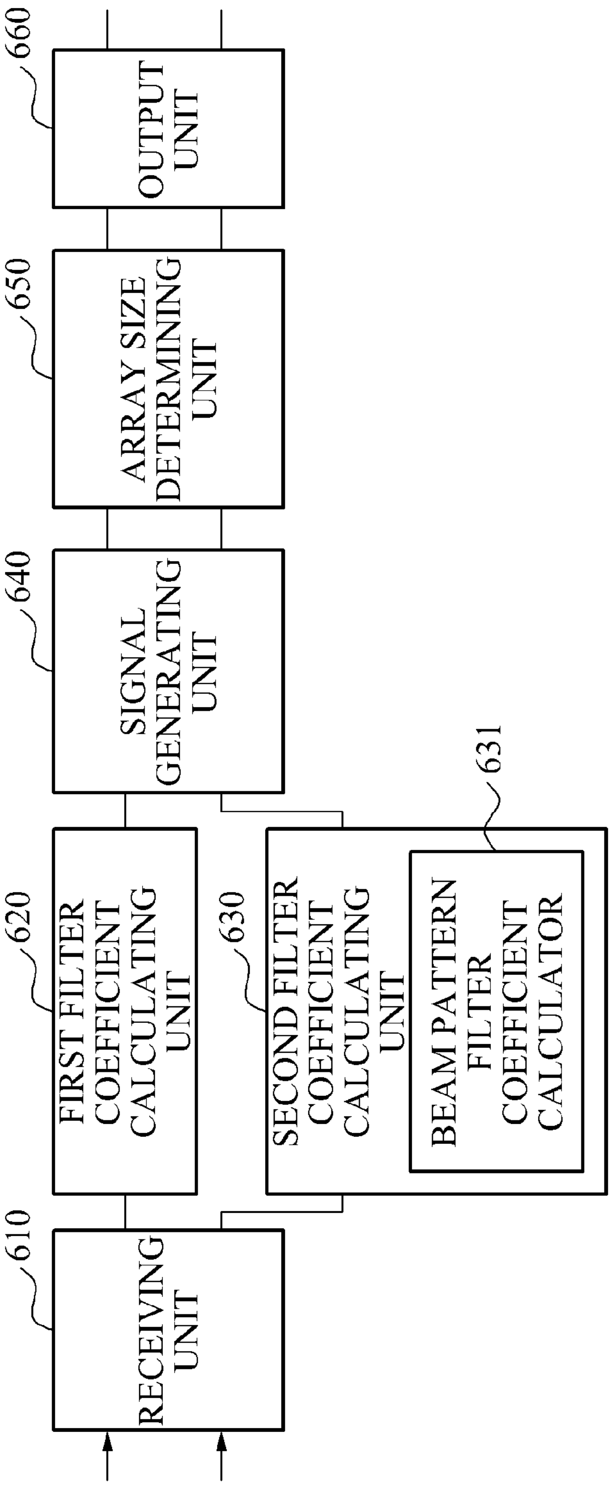
FIG. 6 illustrates a block diagram of an SSE distribution control apparatus in a case where a plurality of sound sources are received, according to example embodiments.

FIG. 6 illustrates a block diagram of an SSE distribution control apparatus in a case where a plurality of sound sources are received, according to example embodiments.

Referring to FIG. 6, the SSE distribution control apparatus may include a receiving unit 610, a first filter coefficient calculating unit 620, a second filter coefficient calculating unit 630, a signal generating unit 640, an array size determining unit 650, and an output unit 660.

The receiving unit 610 may receive a first input signal and a second input signal. The first input signal may be a signal containing sound information. The second input signal may be a masking sound to interrupt transmission of the sound information. The masking sound may be a sound source signal, containing a sound source irrelevant to the sound information, such as classical music.

The first filter coefficient calculating unit 620 may calculate filter coefficients for controlling distribution of a sound energy of the first input signal, in consideration of a sound energy ratio between a first reduction region and a first concentration region and a sound energy efficiency of the first concentration region. The first reduction region may refer to a region to reduce transmission of the sound energy of the first input signal. The first concentration region may refer to a region, to concentrate transmission of the sound energy of the first input signal.

That is, the first filter coefficient calculating unit 620 may calculate the filter coefficients such that the sound information is transmitted to both ears of a listener at a high sound pressure.

The second filter coefficient calculating unit 630 may calculate filter coefficients for controlling distribution of a sound energy of the second input signal, by transmitting the sound energy of the second input signal to at least two concentration regions for concentrating transmission of the sound energy of the second input signal, using at least two separate sound beams.

A second concentration region may be set by the control region setting unit 120 not to overlap the first concentration region. A masking sound irrelevant to the sound information transmitted to the first concentration region is transmitted to the second concentration region. Therefore, a listener located in the second concentration region may listen to the masking sound which is different from the sound information listened to by a listener located in the first concentration region.

Most simply, the separate sound beams may be achieved by generating a plurality of sound beams having different emission directions simultaneously. For example, in order to generate at least two symmetrical sound beams, a beam pattern P1(θ) of one sound beam is determined first, a sound beam having a beam pattern P2 (θ) axially symmetrical to the beam pattern P1(θ), that is, P1(−θ), is generated next, and then those two sound beams are simply combined.

The second filter coefficient calculating unit 630 may include a beam pattern filter coefficient calculator 631. The beam pattern filter coefficient calculator 631 may calculate a filter coefficient for generating the at least two sound beams with respect to the second input signal, such that interference between the beam patterns having the at least two sound beams is minimized.

In addition, the beam pattern filter coefficient calculator 631 may calculate the filter coefficient, to generate the at least two sound beams, by setting relative phases of the at least two sound beams to be combined differently.

To minimize the interference between the beam patterns of the sound beams, the phases of the at least two sound beams to be combined are controlled according to the beam patterns, such that damage of a main lobe or a side lobe after the combining is minimized. For example, when two sound beams P1 and P2 in different directions are generated, $p(\theta)=e^{j\phi}p_1(\theta)+e^{-j\phi}p_2(\theta)$ may be satisfied.

Here, an optimal phase ϕ may be determined to minimize a long distance sound pressure, that is, a sound pressure at a position farther from the second region with respect to the sound pressure of the second concentration region. Also, when a listener is located in the second concentration region, the optimal phase ϕ may be determined to minimize the long distance sound pressure with respect to the sound pressure at positions of both ears of the listener. Here, the long distance is longer than a distance from the center of the array speaker to the listener.

The signal generating unit 640 may filter the first input signal according to the filter coefficients calculated by the first filter coefficient calculating unit 620, thereby generating a plurality of output signals for concentrating transmission of the sound energy on the first concentration region.

Also, the signal generating unit 640 may filter the second input signal according to the second coefficients calculated by the second filter coefficient calculating unit 630, thereby generating a plurality of output signals for concentrating transmission of the sound energy on at least two second concentration regions.

The array size determining unit 650 may determine an array size of the array speaker in a case where the sound energy ratio is maximized, corresponding to the respective frequencies of the plurality of output signals generated from the signal generating unit 640.

The output unit 660 may output the plurality of output signals generated by the signal generating unit 640, based on the array size determined by the array size determining unit 650.

Figure 7:
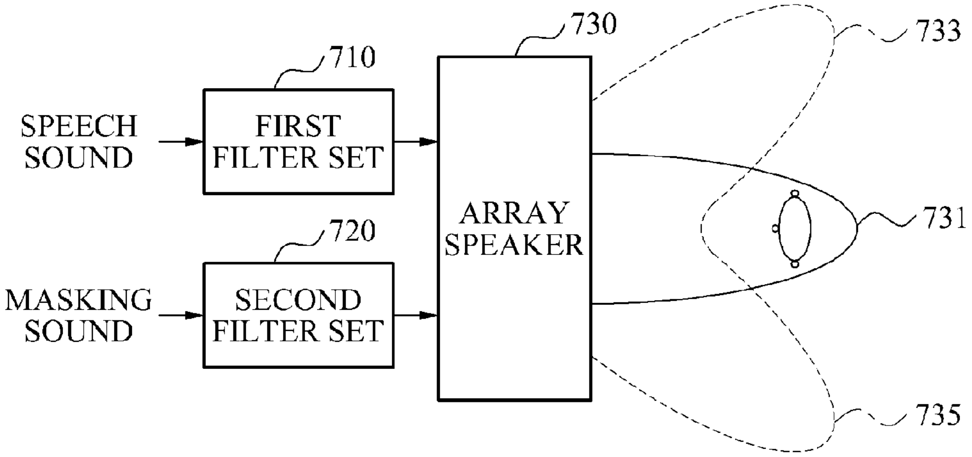
FIG. 7 illustrates a diagram showing a specific exemplary SSE distribution control apparatus in a case where a plurality of sound sources are received, according to example embodiments.

FIG. 7 illustrates a diagram showing a specific exemplary SSE distribution control apparatus in a case where a plurality of sound sources are received, according to example embodiments.

A speech sound containing sound information may be input to a first filter set 710. A masking sound containing a sound source irrelevant to the sound information may be input to the second filter set 720.

The first filter set 710 may generate output signals for concentrating the speech sound on a first concentration region 731, based on the filter coefficients calculated by the first filter coefficient calculating unit 620.

The second filter set 720 may generate output signals for concentrating the masking sound on at least two second concentration regions 733 and 735, based on the filter coefficients calculated by the second filter coefficient calculating unit 630.

The array speaker 730 may emit the output signals transmitted from the first filter set 710 to the first concentration region 731, and emit the output signals transmitted from the second filter set 720 to the at least two concentration regions 733 and 735.

Here, the array size of the array speaker 730 may be varied according to frequencies of sound sources contained in the speech sound and the masking sound. For example, the array size may be small when the frequencies of the sound sources are higher than a predetermined reference, and may be large when the frequencies are lower than the predetermined reference.

Figure 8:
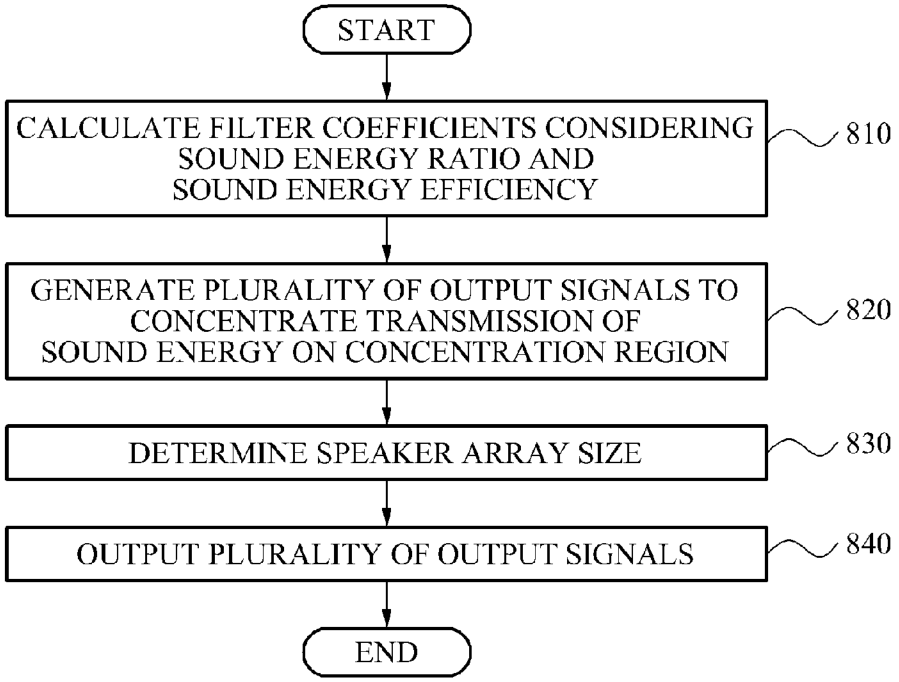
FIG. 8 illustrates a flowchart showing an SSE distribution control method according to example embodiments.

FIG. 8 illustrates a flowchart showing an SSE distribution control method according to example embodiments.

In operation 810, an SSE distribution control apparatus may calculate filter coefficients for controlling distribution of a sound energy of an input signal, in consideration of a sound energy ratio between a reduction region and a concentration region and a sound energy efficiency of the concentration region. Here, the input signal may be a sound source signal containing various frequencies.

The reduction region is a region to reduce transmission of the sound energy emitted through an array speaker. The concentration region is a region to concentrate transmission of the sound energy so that a sound emitted through the array speaker is audible to a listener.

The SSE distribution control apparatus may calculate the sound energies of the reduction region and the concentration region based on a reaction model with respect to frequencies for calculation of the filter coefficients among the various frequencies of the input signal.

The SSE distribution control apparatus may calculate the sound energy ratio and the sound energy efficiency based on the sound energy of the reduction region and the sound energy of the concentration region.

The SSE distribution control apparatus may determine weights to be respectively applied to the sound energy ratio and the sound energy efficiency.

The SSE distribution control apparatus may calculate filter coefficients corresponding to the frequencies for calculation of the filter coefficients, based on a cost function composed of the sound energy ratio and the sound energy efficiency both applying the weights.

In operation 820, the SSE distribution control apparatus may filter the input signal according to the filter coefficients, thereby generating a plurality of output signals to concentrate transmission of the sound energy on the concentration region.

In operation 830, the SSE distribution control apparatus may determine an array size, of an array speaker, in a case where the sound energy ratio is maximized, according to frequency variation of the input signal.

The SSE distribution control apparatus may determine the array size in the case where the sound energy ratio is maximized, by calculating the sound energy ratio corresponding to the respective frequencies of the input signal.

In operation 840, the SSE distribution control apparatus may output the plurality of output signals, based on the determined array size.

In addition, the SSE distribution control apparatus may receive multichannel input signals, each containing a sound source.

Additionally, the SSE distribution control apparatus may calculate the filter coefficients with respect to the multichannel input signals, in consideration of the sound energy ratio between the reduction region and the concentration region and the sound energy efficiency of the concentration region. That is, the SSE distribution control apparatus may calculate the filter coefficients with respect to the respective channels of the multichannel input signals.

Figure 9:
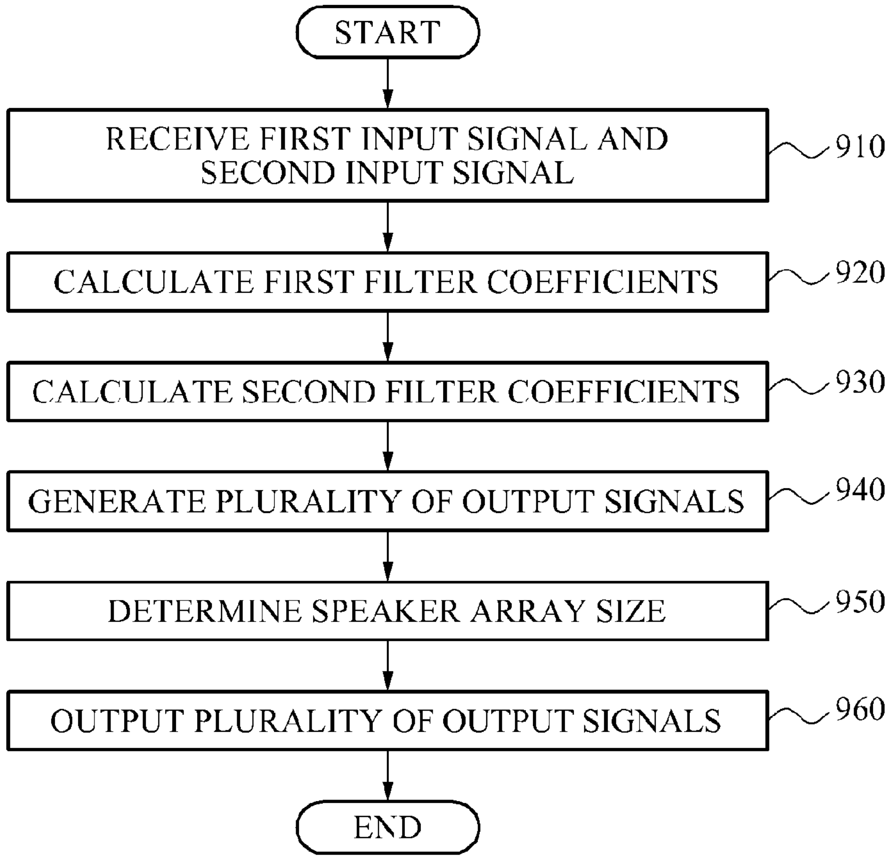
FIG. 9 illustrates a flowchart showing an SSE distribution control method in a case where a plurality of sound sources are received, according to example embodiments.

FIG. 9 illustrates a flowchart showing an SSE distribution control method in a case where a plurality of sound sources are received, according to example embodiments.

In operation 910, the SSE distribution control apparatus may receive a first input signal and a second input signal each containing a sound source.

In operation 920, the SSE distribution control apparatus may calculate first filter coefficients for controlling distribution of a sound energy, of the first input signal, in consideration of a sound energy ratio between a first reduction region and a first concentration region and a sound energy efficiency of the first concentration region. The first reduction region may refer to a region to reduce transmission of the sound energy of the first input signal. The first concentration region may refer to a region to concentrate transmission of the sound energy of the first input signal.

In operation 930, the SSE distribution control apparatus may calculate second filter coefficients for controlling distribution of a sound energy of the second input signal, by transmitting the sound energy of the second input signal to at least two concentration regions for concentrating transmission of the sound energy of the second input signal, using at least two separate sound beams.

The SSE distribution control apparatus may calculate filter coefficients, to generate the at least two sound beams, with respect to the second input signal, such that interference between beam patterns of the at least two sound beams is minimized.

In operation 940, the SSE distribution control apparatus may filter the first input signal and the second input signal according to the first filter coefficients and the second filter coefficients, thereby generating a plurality of output signals for concentrating transmission of the sound energy on the first concentrate region and the second concentration region.

In operation 950, the SSE distribution control apparatus may determine an array size of an array speaker in a case where the sound energy ratio is maximized, according to respective frequencies of the plurality of output signals.

In operation 960, the SSE distribution control apparatus may output the plurality of output signals based on the determined array size.

The SSE distribution control apparatus according to the example embodiments may be applied to various audio signal transmission devices requiring a PSZ. Here, the various audio signal transmission devices may include an array device including a plurality of speakers, a monitor, a portable music player, a digital TV, a PC, and the like.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. An apparatus for controlling distribution of a spatial sound energy (SSE), the apparatus comprising:

a filter coefficient calculating unit to calculate filter coefficients to control distribution of a sound energy of an input signal which is a sound source signal having a wideband frequency, in consideration of a sound energy ratio between a reduction region for reducing transmission of a sound energy emitted through an array speaker and a concentration region for concentrating transmission of the sound energy and also in consideration of a sound energy efficiency of the concentration region; and an array size determining unit to determine an array size of the array speaker according to frequency variation of the input signal and to maximize the sound energy ratio, wherein an aperture size of the array speaker is varied according to the array size, and wherein the array speaker is a non-uniform array.

2. The apparatus of claim 1, wherein the filter coefficient calculating unit comprises:

a sound energy calculator to calculate, based on a reaction model, sound energies of the reduction region and the concentration region related to frequencies for calculation of the filter coefficients among various frequencies of the input signal;

a sound energy ratio and efficiency calculator to calculate the sound energy ratio and the sound energy efficiency based on the sound energy of the reduction region and the sound energy of the concentration region; and a weight determiner to determine weights respectively applied to the sound energy ratio and the sound energy efficiency, wherein the filter coefficient calculating unit calculates the filter coefficients based on a cost function consisting of the weighted sound energy ratio and the weighted sound energy efficiency.

3. The apparatus of claim 1, wherein the array size determining unit calculates the sound energy ratio corresponding to respective frequencies of the input signal and determines the array size to maximize the sound energy efficiency in the respective frequencies.

4. The apparatus of claim 1, further comprising:

a signal generating unit to generate a plurality of output signals to concentrate transmission of the sound energy on the concentration region by filtering the input signal according to the filter coefficients; and an output unit to output the plurality of output signals based on the array size.

5. The apparatus of claim 4, further comprising a band dividing unit to divide the input signal into a low frequency band, a medium frequency band, and a high frequency band, according to a predetermined reference, wherein the signal generating unit comprises a band filter set to filter the input signal with respect to the divided bands according to the calculated filter coefficients.

6. The apparatus of claim 1, further comprising a control region setting unit to set a control region comprising the reduction region and the concentration region.

7. The apparatus of claim 1, further comprising a receiving unit to receive multichannel input signals containing a sound source, wherein the filter coefficient calculating unit calculates the filter coefficients with respect to the respective multichannel input signals, in consideration of the sound energy ratio between the reduction region and the concentration region and the sound energy efficiency of the concentration region.

8. The apparatus of claim 7, wherein the receiving unit comprises:

a channel conversion filter to convert the multichannel input signals into 2-channel input signals; and a crosstalk removal filter to remove crosstalk among the 2-channel signals.

9. The apparatus of claim 1, wherein the array speaker comprises a plurality of speakers separated by partitions, and the aperture size of the array speaker is varied by the plurality of speakers according to the determined array size.

10. A method for controlling distribution of a spatial sound energy (SSE), the method comprising:

calculating filter coefficients that control distribution of a sound energy of an input signal which is a sound source signal having a wideband frequency, in consideration of a sound energy ratio between a reduction region for reducing transmission of a sound energy emitted through an array speaker and a concentration region for concentrating transmission of the sound energy and also in consideration of a sound energy efficiency of the concentration region;

generating a plurality of output signals to concentrate transmission of the sound energy on the concentration region by filtering the input signal according to the filter coefficients;

determining an array size of the array speaker according to frequency variation of the input signal and to maximize the sound energy ratio;

varying an aperture size of the array speaker according to the array size; and outputting the plurality of output signals via the array speaker, wherein the array speaker is a non-uniform array.

11. The method of claim 10, wherein calculating the filter coefficients comprises:

calculating, based on a reaction model, sound energies of the reduction region and the concentration region related to frequencies for calculation of the filter coefficients among various frequencies of the input signal;

calculating the sound energy ratio and the sound energy efficiency based on the sound energy of the reduction region and the sound energy of the concentration region;

determining weights respectively applied to the sound energy ratio and the sound energy efficiency; and calculating the filter coefficients based on a cost function consisting of the weighted sound energy ratio and the weighted sound energy efficiency.

12. The method of claim 10, wherein determining the array size comprises:

calculating the sound energy ratio corresponding to the respective frequencies of the input signal and determining the array size to maximize the sound energy ratio in the respective frequencies.

13. The method of claim 10, further comprising:

receiving multichannel input signals containing a sound source, wherein the filter coefficients are calculated with respect to the multichannel input signals, in consideration of the sound energy ratio between the reduction region and the concentration region and also in consideration of the sound energy efficiency.

* * * * *